(12) United States Patent
Yoshino

(10) Patent No.: US 8,801,345 B2
(45) Date of Patent: Aug. 12, 2014

(54) CUTTING METHOD AND CUTTING APPARATUS

(75) Inventor: Kiyoshi Yoshino, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 1156 days.

(21) Appl. No.: 12/482,679

(22) Filed: Jun. 11, 2009

(65) Prior Publication Data

US 2010/0005936 A1 Jan. 14, 2010

(30) Foreign Application Priority Data

Jul. 9, 2008 (JP) ................................ 2008-179412

(51) Int. Cl.
*B23P 23/02* (2006.01)
*B23C 1/12* (2006.01)
*B23C 1/18* (2006.01)
*B23B 1/00* (2006.01)
*B23Q 15/26* (2006.01)

(52) U.S. Cl.
CPC . *B23P 23/02* (2013.01); *B23C 1/12* (2013.01); *B23Q 15/26* (2013.01); *B23B 1/00* (2013.01)
USPC ........... 409/131; 409/141; 409/201; 409/165; 82/1.11; 29/27 R; 700/173

(58) Field of Classification Search
USPC .................. 82/1.11, 118, 903; 700/173–174; 409/131–132, 141, 201, 211, 216, 165; 29/27 C, 27 R
See application file for complete search history.

(56) References Cited

U.S. PATENT DOCUMENTS

| | | | |
|---|---|---|---|
| 5,205,806 A * | 4/1993 | Ishida et al. | 29/33 P |
| 6,988,860 B2 * | 1/2006 | Ishii et al. | 409/297 |
| 7,129,665 B2 * | 10/2006 | Ando | 318/571 |
| 8,347,713 B2 * | 1/2013 | Yamaguchi et al. | 73/460 |
| 2006/0111019 A1 * | 5/2006 | Hyatt et al. | 451/6 |
| 2008/0282854 A1 | 11/2008 | Momoi et al. | |

FOREIGN PATENT DOCUMENTS

| | | |
|---|---|---|
| JP | 49-105277 A1 | 10/1974 |
| JP | 11-019850 A * | 1/1999 |
| JP | 2590593 Y2 | 2/1999 |
| JP | 2008-284641 A1 | 11/2008 |

OTHER PUBLICATIONS

JIS B 0182, 1 page, 1993.*
Shaik, J.H., "Identification of Dynamic Rigidity for High Speed Spindles Supported on Ball Bearings", vol. 2, Issue: 7, pp. 146-150, Jul. 2013.*
Supplemental Textbook for Production Systems, p. 31 (with 3-page English Summary Translation), Mar. 2003.*
Extract from treatise entitled, "Study about Rigidity of Machine Tool and Machining Accuracy", 7 pages, 1983.*

* cited by examiner

*Primary Examiner* — Erica E Cadugan
(74) *Attorney, Agent, or Firm* — Burr & Brown, PLLC

(57) ABSTRACT

A tool main spindle, whose cutting angle can be changed, is translated by an X-axis moving mechanism portion on an X-axis provided in a plane perpendicular to an axis of a work; and is translated on a Y-axis by a Y-axis moving mechanism portion. Cutting of the work is performed by setting the cutting angle of the tool main spindle to an angle of the cutting tool at which the work has large dynamic rigidity, and causing an axis of a cutting tool to cross the work axis, and cutting the work with the cutting tool toward the axis of the work by cooperatively operating the X-axis moving mechanism portion and the Y-axis moving mechanism portion.

1 Claim, 12 Drawing Sheets

CUTTING METHOD AND CUTTING APPARATUS

BACKGROUND OF THE INVENTION

This application claims the benefit of Japanese Patent Application Number 2008-179412 filed on Jul. 9, 2008, the entirety of which is incorporated by reference.

1. Field of the Invention

The present invention relates to cutting, more particularly, relates to a cutting method and a cutting apparatus which are capable of accurate cutting with a low incidence of chatter vibration and the like in a work.

2. Description of the Related Art

Cutting is generally performed by the structure shown in the illustration of FIG. 11. In FIG. 11, reference numeral 35 indicates a workpiece (work) to be cut, reference numeral 36 indicates a tool post, reference numeral 37 indicates a cutting tool, reference numeral 38 indicates a motor, reference numeral M1 indicates an axis of the work 35, and reference numeral M5 indicates a tool axis. As shown in FIG. 11, the tool post 36 has the cutting tool 37 so that the axis M1 of the work 35 and the tool axis M5 cross each other. The tool post 36 is translatable in an X-axis direction by the motor 38. Outer-diameter cutting is performed by cutting the work 35 in the axis direction of the work 35 with the cutting tool from the X-axis direction by the motor 38, and then feeding the cutting tool 37 in the work axis-M1 direction while rotating the work 35.

However, performing heavy cutting by this cutting method generates chatter vibration when the work 35 has low dynamic rigidity, thereby causing problems in some cases, such as reducing a finishing accuracy of a processing surface of the work 35, damaging the cutting tool 37, and the like. The cutting methods described in, for example, Japanese Registered Utility Model No. 2,590,593 and Japanese Unexamined Patent Publication No. S49-105277 were proposed to solve such problems. The method described in Japanese Registered Utility Model No. 2,590,593 suppresses vibration of the work 35 by bringing a steady rest into contact with the work 35 for lathe turning (cutting) of the work 35. The method described in Japanese Unexamined Patent Publication No. S49-105277 suppresses chatter vibration by periodically changing the rotational speed of the work 35, that is, the rotational speed of a main spindle.

However, the method described in Japanese Registered Utility Model No. 2,590,593 is not suitable for reducing the size of a machine tool because the steady rest for the work 35 is provided in a processing machine and thus a processing region is reduced. The method described in Japanese Unexamined Patent Publication No. S49-105277, on the other hand, changes the rotational speed of a main spindle during processing, and thus tends to leave marks on the processing surface of the work 35 due to the change in rotational speed, thereby causing a problem such as reduced finishing accuracy.

The chatter vibration and the dynamic rigidity of the work will now be described. The chatter vibration of the work is a vibration phenomenon which occurs during processing. Whether the chatter vibration occurs or not depends on the processing conditions, the dynamic rigidity of the work, and the like. The chatter vibration tends to occur under high-load conditions such as heavy cutting, and tends to occur when the work has low dynamic rigidity.

FIG. 12 shows an example of a dynamic compliance of the work which is an inverse number of the dynamic rigidity. This figure shows that the dynamic compliance is small (the dynamic rigidity is large) in the direction of 30°, and the dynamic compliance is large (the dynamic rigidity is small) in the direction of 120°. Thus, the dynamic compliance of the work is normally anisotropic, and the dynamic rigidity varies according to the angle. The same applies to the case where the work itself has a cylindrical shape and is isotropic. This is due to the influence of intrinsic anisotropy in the spindle stock.

This measurement result shows that the chatter vibration tends to be generated during cutting when the cutting angle toward the rotation center of the work is set to be 120° which is an angle with large dynamic compliance, while the chatter vibration is less likely to be generated and excellent cutting can be performed when the cutting angle is set to be 30° which is an angle with small dynamic compliance. Rotary cutting using a rotating tool as the cutting tool is similar in this regard. In rotary cutting as well, cutting at an angle with small dynamic compliance is equal to cutting at an angle with high dynamic rigidity, whereby accurate cutting can be achieved.

SUMMARY OF THE INVENTION

The present invention was developed in view of the above characteristics of the dynamic rigidity of the work, and it is an object of the present invention to provide a highly versatile cutting method and a highly versatile cutting apparatus capable of suppressing chatter vibration and improving processing accuracy without reducing a processing region and without reducing the finishing accuracy of a processing surface.

In order to solve the above problems, the invention according to a first aspect is a cutting method for cutting a work comprising steps of; positioning a cutting tool from a direction perpendicular to an axis of the work toward the axis; providing an angle changing unit for changing a cutting angle of the cutting tool; detecting an angle of the cutting tool at which the work has large dynamic rigidity; adjusting the angle changing unit so that the cutting angle of the cutting tool toward the work axis becomes equal to the angle at which the work has large dynamic rigidity; and cutting the work with the cutting tool while maintaining the set cutting angle.

According to this method, cutting is performed by setting the cutting angle toward a rotation center of the work to a direction in which the work has large dynamic rigidity. Therefore, the generation of chatter vibration can be suppressed and accurate processing can be implemented. Further, since a device such as a steady rest is not required, high versatility can be obtained without affecting the processing region.

The invention according to a second aspect is a cutting apparatus for cutting a work including a cutting tool positioned from a direction perpendicular to an axis of the work toward the axis, wherein one of the work and the cutting tool rotates. The cutting apparatus includes: an angle changing unit for changing a cutting angle of the cutting tool; an angle detecting unit for detecting an angle of the cutting tool at which the work has large dynamic rigidity; an angle setting unit for controlling the angle changing unit; and a cutting control unit for controlling cutting. The angle setting unit controls the angle changing unit so that the cutting angle of the cutting tool becomes equal to the angle at which the work has large dynamic rigidity as detected by the angle detecting unit. The cutting control unit performs cutting of the work with the cutting tool while maintaining the cutting angle set by the angle setting unit.

According to this structure, the angle detecting unit detects the angle with largest dynamic rigidity, and the angle setting unit sets the cutting angle toward a rotation center of the work to the direction of the largest dynamic angle. Therefore, the generation of chatter vibration can be suppressed and accurate processing can be implemented. Further, since a device such as a steady rest is not required, high versatility can be obtained without affecting the processing region.

The invention according to a third aspect is the cutting apparatus of the invention according to the second aspect, wherein: the cutting tool is mounted to a tool main spindle that is positioned in a direction perpendicular to the axis of the work, while the angle changing unit includes a first moving unit moving on a first axis provided in a plane perpendicular to the axis of the work, a second moving unit moving on a second axis different from the first axis and provided in a plane perpendicular to the axis of the work, and a tool-main-spindle pivoting portion provided in the tool main spindle for enabling the cutting angle to be changed; the angle setting unit controls a cutting angle of the tool main spindle so that the cutting angle of the tool main spindle becomes equal to the angle at which the work has large dynamic rigidity as detected by the angle detecting unit, and controls the first moving unit and the second moving unit so that the axis of the cutting tool crosses the axis of the work; and the cutting control unit controls the first moving unit and the second moving unit to translate the cutting tool on the two axes, thereby cutting the rotating work toward a rotation center of the work while the two axes are maintained in the crossed state.

According to this structure, the cutting angle can be easily set to the angle with large dynamic rigidity by pivoting the tool-main-spindle pivoting portion. Moreover, the rotating work can be cut by translating the cutting tool using the first moving unit and the second moving unit. Thus, the generation of chatter vibration can be suppressed and accurate lathe turning can be implemented.

The invention according to a fourth aspect is the cutting apparatus of the invention according to the second aspect, wherein: the cutting tool is mounted to a tool post that is positioned in a direction perpendicular to the axis of the work, while the angle changing unit includes a composite saddle of a lower saddle for adjusting a height of the tool post and an upper saddle provided over the lower saddle for changing a cutting angle of the tool post; the upper saddle includes a single-axis moving unit for translating the cutting tool to a direction of the set cutting angle; the angle setting unit controls an angle of the upper saddle so that the cutting angle of the tool post becomes equal to the angle at which the work has large dynamic rigidity as detected by the angle detecting unit, and controls the lower saddle so that the axis of the cutting tool crosses the axis of the work; and the cutting control unit controls the single-axis moving unit to cut the rotating work toward a rotation center of the work.

According to this structure, the cutting angle can be easily set to the angle with large dynamic rigidity by changing a tilt angle of the tool post. Moreover, the rotating work can be cut by causing the axis of the cutting tool to cross the axis of the work with the lower saddle and the upper saddle and maintaining the cutting angle. Thus, the generation of chatter vibration can be suppressed and accurate lathe turning can be implemented.

The invention according to a fifth aspect is the cutting apparatus of the invention according to the second aspect, wherein: the cutting tool is mounted to a tool main spindle that is positioned in a direction perpendicular to the axis of the work and including a tool rotating unit, while the angle changing unit includes a first moving unit moving on a first axis provided in a plane perpendicular to the axis of the work, a second moving unit moving on a second axis different from the first axis and provided in a plane perpendicular to the axis of the work, and a tool-main-spindle pivoting portion provided in the tool main spindle for enabling the cutting angle to be changed; the angle setting unit controls a cutting angle of the tool main spindle so that the cutting angle of the tool main spindle becomes equal to the angle at which the work has large dynamic rigidity as detected by the angle detecting unit, and controls the first moving unit and the second moving unit so that the axis of the cutting tool crosses the axis of the work; and the cutting control unit controls the first moving unit and the second moving unit to translate the cutting tool on the two axes, and rotates the cutting tool while the two axes are maintained in the crossed state, thereby cutting the work toward an axis of the work.

According to this structure, the cutting angle can be easily set to the angle with large dynamic rigidity by pivoting the tool-main-spindle pivoting portion. Moreover, the work can be cut with the rotating tool by translating the cutting tool using the first moving unit and the second moving unit. Thus, the generation of chatter vibration can be suppressed and accurate rotary cutting can be implemented.

The invention according to a sixth aspect is the cutting apparatus of the invention according to the second aspect, wherein: the cutting tool is mounted to a tool post that is positioned in a direction perpendicular to the axis of the work and includes a tool rotating unit, while the angle changing unit includes a composite saddle of a lower saddle for adjusting a height of the tool post and an upper saddle provided over the lower saddle for changing a cutting angle of the tool post; the upper saddle includes a single-axis moving unit for translating the cutting tool to a direction of the set cutting angle; the angle setting unit controls an angle of the upper saddle so that the cutting angle of the tool post becomes equal to the angle at which the work has large dynamic rigidity as detected by the angle detecting unit, and controls the lower saddle so that the axis of the cutting tool crosses the axis of the work; and the cutting control unit controls the single-axis moving unit and rotates the cutting tool while the two axes are maintained in the crossed state, thereby cutting the work toward an axis of the work.

According to this structure, the cutting angle can be easily set to the angle with large dynamic rigidity by changing the tilt angle of the tool post. Moreover, the work can be cut with the rotating tool by causing the axis of the cutting tool to cross the axis of the work with the lower saddle and the upper saddle and maintaining the cutting angle. Thus, the generation of chatter vibration can be suppressed and accurate rotary cutting can be implemented.

According to the present invention, cutting can be performed by setting the cutting angle toward the rotation center of the work to a direction in which the work has large dynamic rigidity. Therefore, the generation of chatter vibration can be suppressed and cutting can be performed with high finished surface accuracy. Further, since a device such as a steady rest is not separately required, high versatility can be obtained without affecting the processing region.

DETAILED DESCRIPTION OF THE INVENTION

Hereinafter, embodiments of the present invention will be described in detail with reference to the accompanying drawings.

First Embodiment

Figure 1:
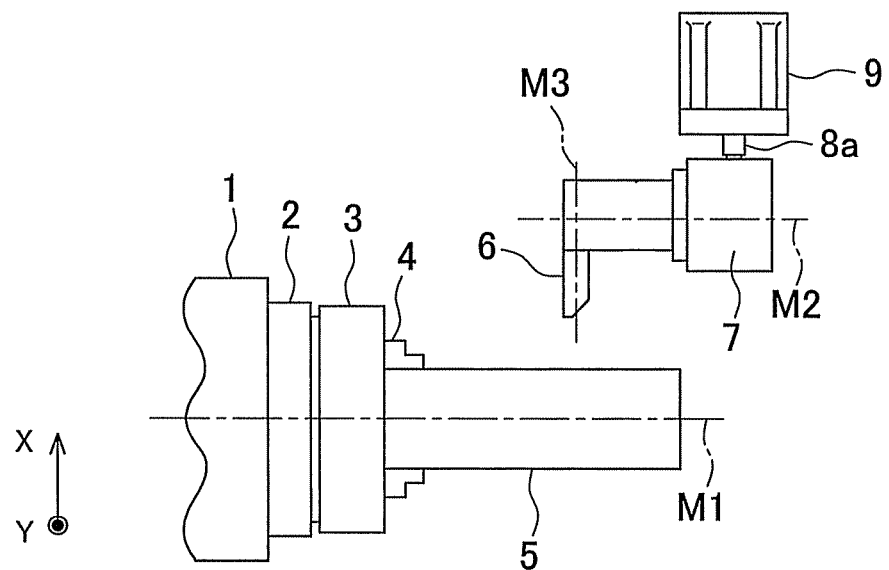
FIG. 1 is a plan view illustration showing a first embodiment of a cutting apparatus according to the present invention.
Figure 2:
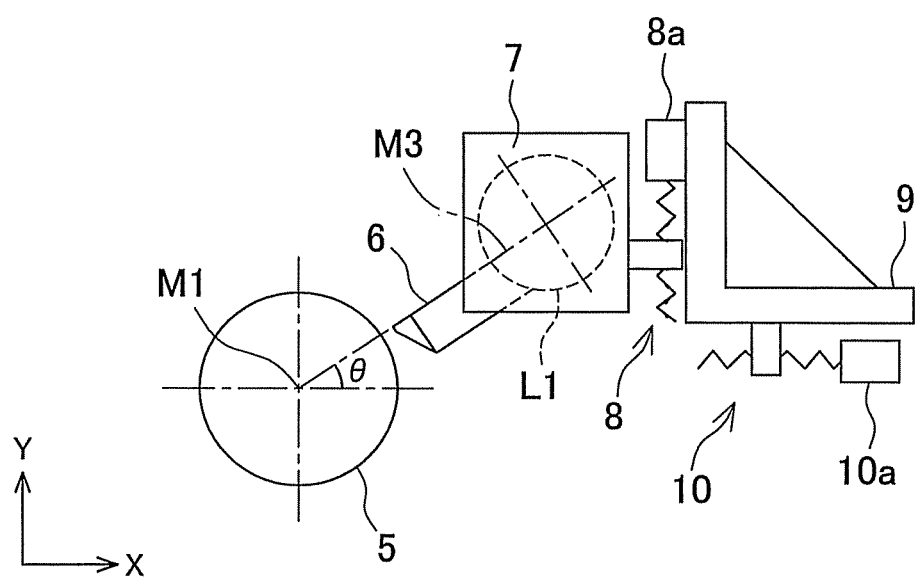
FIG. 2 is a front view illustration of FIG. 1.
Figure 3:
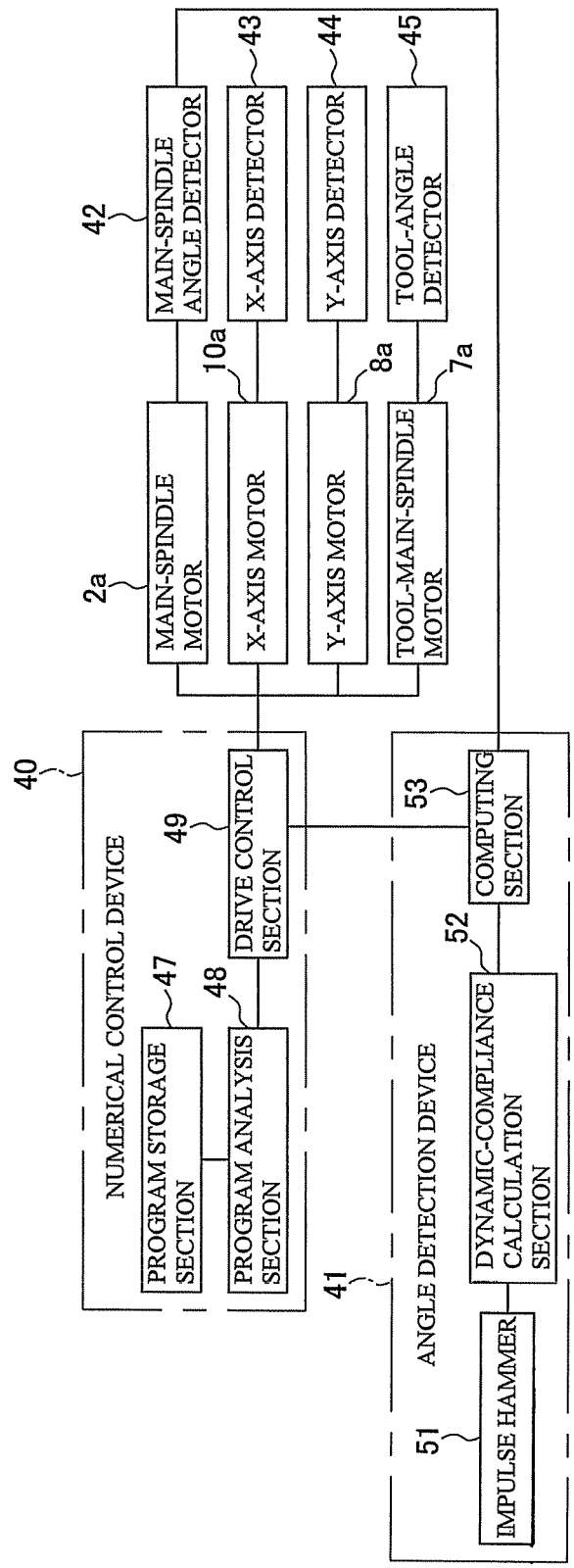
FIG. 3 is a block diagram of a control device of the cutting apparatus of FIG. 1.

FIGS. 1 to 3 are illustrations showing a first embodiment of a cutting apparatus according to the present invention. FIG. 1 is a plan view from a Y-axis direction, and FIG. 2 is a front view from an axis direction of a work. In FIGS. 1 and 2, reference numeral 1 indicates a spindle stock of the cutting apparatus, reference numeral 2 indicates a main spindle rotatably supported by the spindle stock 1, reference numeral 3 indicates a chuck provided at the tip of the main spindle 2 and including a pawl 4 for holding the work 5, reference numeral 6 indicates a cutting tool, reference numeral 7 indicates a tool main spindle to which the cutting tool 6 is attached, reference numeral 8 indicates a Y-axis moving mechanism portion for translating the tool main spindle 7 in the Y-axis direction, reference numeral 9 indicates a saddle mounted on a base (not shown) of the cutting apparatus for enabling the tool main spindle 7 to be moved in an X-axis direction, and reference numeral 10 indicates an X-axis moving mechanism portion for translating the saddle 9 in the X-axis direction.

The Y-axis moving mechanism portion 8 and the X-axis moving mechanism portion 10 are formed by ball screw mechanisms. The Y-axis moving mechanism portion 8 is driven by a Y-axis motor 8a mounted on the saddle 9, and the X-axis moving mechanism portion 10 is driven by an X-axis motor 10a mounted on the base.

It should be noted that reference numeral M1 indicates a work axis which is the rotation center of the work, reference numeral M2 indicates a tool-main-spindle axis, and reference numeral M3 indicates a tool axis. A plane perpendicular to the work axis M1 is an XY plane. The tool main spindle 7 holds the cutting tool 6 at an end thereof in a rotationally indexable manner so that the tool-main-spindle axis M2 and the tool axis M3 cross each other. The tool main spindle 7 includes a tool-main-spindle pivoting portion L1 for enabling the cutting angle of the cutting tool to be changed.

FIG. 3 shows a control device for controlling this cutting apparatus. As shown in FIG. 3, the control device includes a numerical control device 40 for controlling various motors, an angle detection device 41 for calculating an angle with large dynamic rigidity, a main-spindle angle detector 42 for detecting a rotation angle of the main spindle 2, an X-axis detector 43 for detecting an X-axis displacement amount resulting from driving with the X-axis motor 10a, a Y-axis detector 44 for detecting a Y-axis displacement amount resulting from driving with the Y-axis motor 8a, and a tool-angle detector 45 for detecting an angle of the cutting tool 6.

It should be noted that reference numeral 2a indicates a main-spindle motor for rotating the main spindle 2, and reference numeral 7a indicates a tool-main-spindle motor for driving the tool-main-spindle pivoting portion L1.

The numerical control device 40 includes a program storage section 47 for storing a work processing program, a program analysis section 48 for analyzing the processing program, and a drive control section 49 for controlling various motors. The angle detection device 41 includes an impulse hammer 51, a dynamic-compliance calculation section 52, and a computing section 53 for calculating the angle with the largest dynamic rigidity based on dynamic compliance.

More specifically, in the angle detection device 41, vibration generated by the impulse hammer 51 is processed (e.g., Fourier analysis) into a dynamic compliance value in the dynamic-compliance calculation section 52. The computing section 53 simultaneously receives the dynamic compliance value and the main-spindle angle, and obtains a main-spindle angle, i.e., a work angle ($\theta$), of the smallest dynamic compliance (the largest dynamic rigidity). This process may be performed either by comparing the dynamic compliance values sequentially supplied during measurement by the impulse hammer with the previous value and leaving the smaller value and angle, or by storing the values for one rotation of the main spindle (work) and selecting the smallest angle.

Then, the angle with the largest dynamic rigidity obtained by the computing section 53 is applied to the drive control section 49. The drive control section 49 combines the received angle with a control command generated by analyzing a normal processing program, thereby producing a motor driving signal to control each motor.

The cutting apparatus structured as described above performs cutting as follows. First, an angle ($\theta$) with the largest dynamic rigidity is obtained by the above procedure. In the case where the measurement result shows that the direction in which the work 5 has large dynamic rigidity is at an angle of $\theta$ from the X-axis direction (the state shown in FIG. 2), the numerical control device 40 controls the tool-main-spindle pivoting portion L1 of the tool main spindle 7 so that a cutting angle toward the axis M1 of the work 5, that is, toward the rotation center, becomes $\theta$.

The numerical control device 40 then operates the X-axis motor 10a and the Y-axis motor 8a so as to maintain the state in which the tool axis M3 of the cutting tool 6 crosses the work axis M1 at this angle. Thus, a cutting control (lathe turning control) is performed so that the cutting tool 6 cuts the work 5 toward the work axis M1.

Outer-diameter cutting of the work 5 is performed by maintaining the cutting angle $\theta$ of the cutting tool 6 at a fixed value while rotating the work 5 together with the main spindle 2, and translating the cutting tool 6 while maintaining the state in which the tool axis M3 crosses the work axis M1. In other words, outer-diameter cutting is performed by cutting the work 5 with the cutting tool 6 toward the work axis M1.

The cutting tool 6 is translated by moving the tool main spindle 7 through cooperative operation of the X-axis motor 10a and the Y-axis motor 8a. The outer peripheral surface of the work 5 is cut in this manner. The cutting tool 6 is then fed along the work axis M1, whereby the outer-diameter cutting is performed.

It should be noted that a similar operation is performed when the outer periphery of the work 5 is grooved. Like outer-diameter cutting, cutting is performed by indexing an angle of the cutting tool 6, and feeding the tool main spindle 7 along the tool axis M3 in a moving operation achieved by synthesis of the X-axis and the Y-axis.

Because the cutting angle toward the rotation center of the work is thus set to a direction in which the work has large dynamic rigidity, the generation of chatter vibration can be suppressed and accurate processing can be implemented. Further, since a device such as a steady rest is not required, high versatility can be obtained without affecting the processing region.

Moreover, the cutting angle can be easily set to an angle with large dynamic rigidity by pivoting the tool-main-spindle pivoting portion. By translating the cutting tool using the X-axis moving mechanism portion and the Y-axis moving mechanism portion, cutting of the rotating work can be performed while the work axis and the tool axis are maintained in the crossed state. As a result, accurate lathe turning can be implemented.

Second Embodiment

Figure 4:
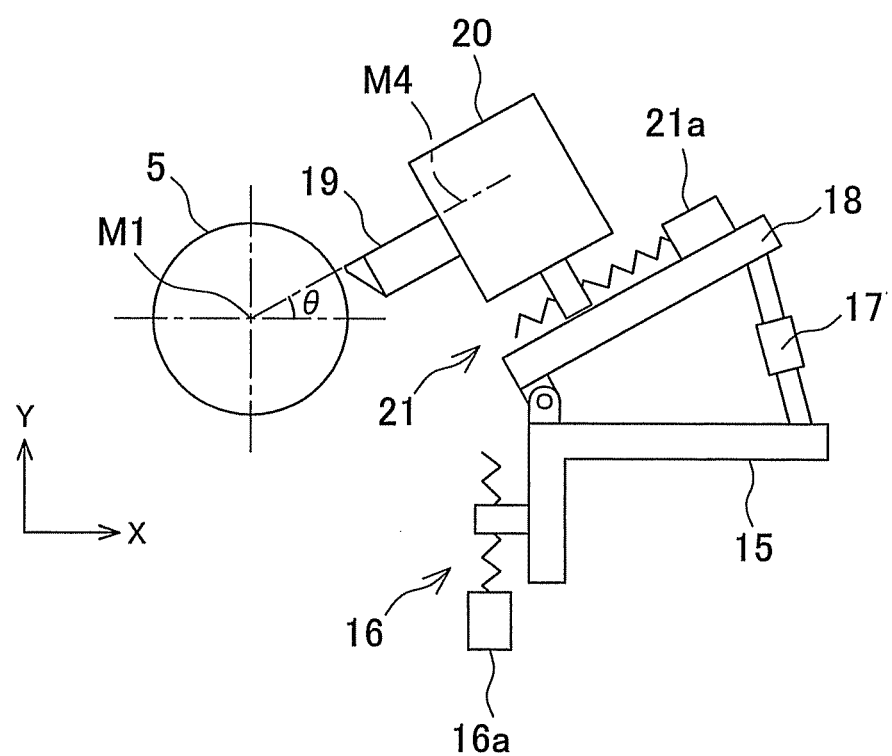
FIG. 4 is a front view illustration showing a second embodiment of the cutting apparatus according to the present invention.

FIG. 4 shows a second embodiment of the cutting apparatus according to the present invention. FIG. 4 is a front view from the axis direction of the work 5. In FIG. 4, reference numeral 15 indicates a lower saddle which translates in the Y-axis direction, reference numeral 16 indicates a Y-axis moving mechanism portion for translating the lower saddle 15 in the Y-axis direction, reference numeral 18 indicates an upper saddle positioned above the lower saddle 15 for providing a cutting angle to a cutting tool 19, reference numeral 17 indicates a jack for adjusting a tilt angle of the upper saddle 18, reference numeral 20 indicates a tool post to which the cutting tool 19 is mounted, and reference numeral 21 indicates an XS-axis moving mechanism portion for translating the tool post 20.

The upper saddle 18 has one end thereof on the work 5 side rotatably connected to the lower saddle 15, and another end supported by the retractable jack 17. The tool post 20 is mounted to the upper saddle 18 through the XS-axis moving mechanism portion 21 provided on the upper saddle 18. The tool post 20 is mounted so as to be translatable in the maximum tilting direction of the upper saddle 18.

The Y-axis moving mechanism portion 16 and the XS-axis moving mechanism portion 21 are formed by ball screw mechanisms. The Y-axis moving mechanism portion 16 is driven by a Y-axis motor 16*a* mounted on a base (not shown), and the XS-axis moving mechanism portion 21 is driven by an XS-axis motor 21*a* mounted on the upper saddle 18. Thus, the tool post 20 moves vertically by a composite saddle formed from the lower saddle 15 and the upper saddle 18, and the cutting angle of the tool post 20 can be changed. The tool post 20 can be set to any cutting angle by controlling the Y-axis motor 16*a* and a jack drive motor (not shown) provided for the jack 17. Reference numeral M4 indicates a tool axis.

Figure 5:
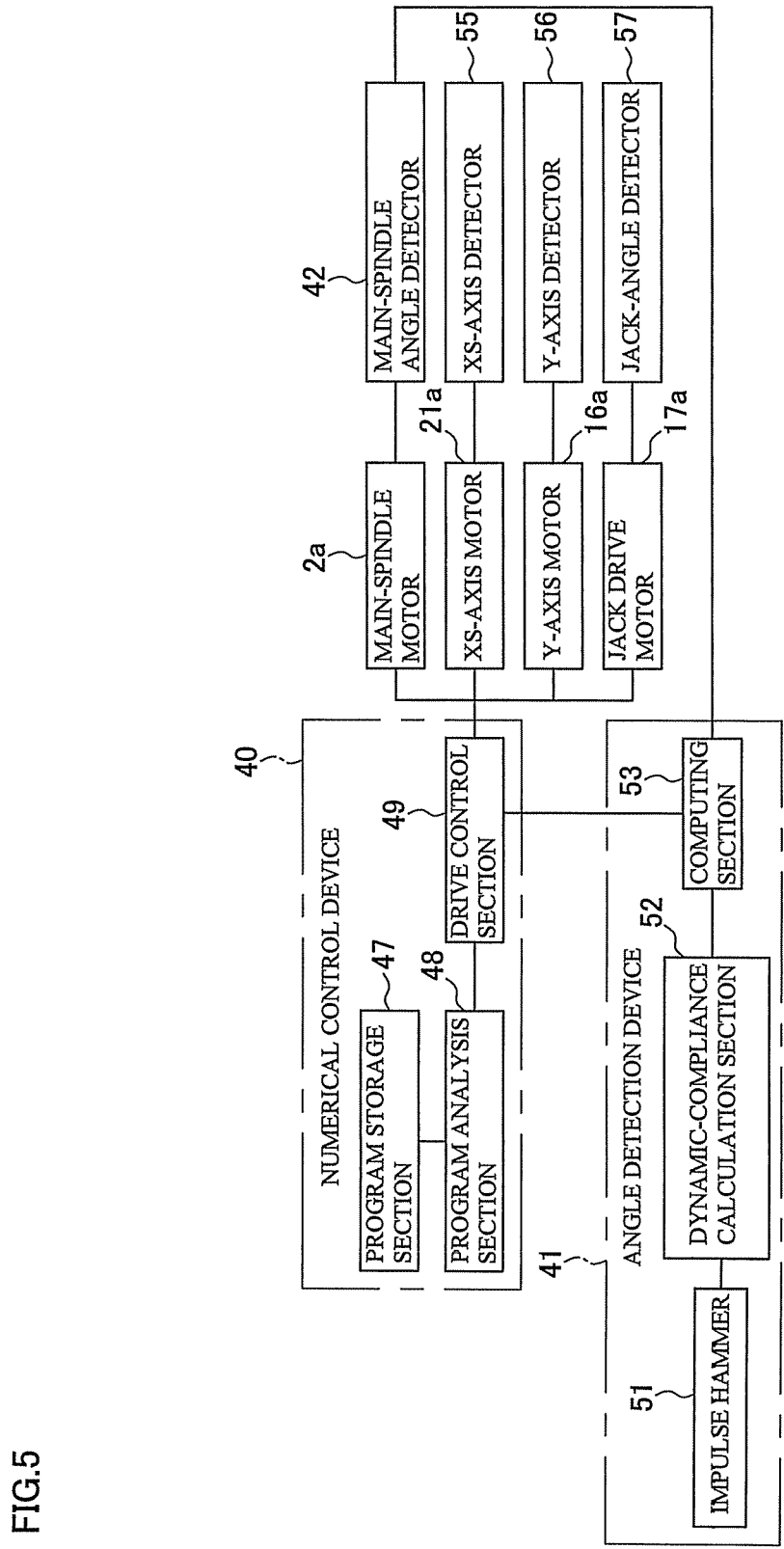
FIG. 5 is a block diagram of a control device of the cutting apparatus of FIG. 4.

FIG. 5 shows a control device for controlling this cutting apparatus. The control device of FIG. 5 is different from that of FIG. 3 with regard to the structures of the motors and the detectors controlled by the drive control section 49. The control device of FIG. 5 includes the XS-axis motor 21*a*, an XS-axis detector 55 for detecting a displacement amount resulting from driving with the XS-axis motor 21*a*, a jack drive motor 17*a* for driving the jack 17, and a jack-angle detector 57 for detecting an angle which is changed by driving with the jack drive motor 17*a*. It should be noted that components similar to those of FIG. 3 are denoted by the same reference numerals and characters as used in FIG. 3, and descriptions thereof will be omitted.

The cutting apparatus structured as described above performs cutting as follows. First, an angle (θ) with the largest dynamic rigidity is obtained by a procedure similar to that of the first embodiment. This angle is an angle viewed from the X-axis direction, and FIG. 4 shows a state in which the cutting angle has been set to the obtained angle θ.

Based on the angle information thus obtained, the numerical control device 40 controls the jack drive motor 17*a* to set the cutting angle toward the rotation center of the work 5 to θ.

Next, the numerical control device 40 adjusts the height of the tool post 20 using the Y-axis motor 16*a* of the Y-axis moving mechanism portion 16 so that the work axis M1 and the tool axis M4 cross each other. Then, the numerical control device 40 controls the XS-axis motor 21*a* of the XS-axis moving mechanism portion 21 to translate the tool post 20 and the cutting tool 19, thereby cutting the work 5 toward the rotation center of the work 5. Cutting is thus performed in this manner.

Because the cutting angle toward the rotation center of the work is thus set to a direction in which the work has large dynamic rigidity, the generation of chatter vibration can be suppressed and accurate processing can be implemented. Further, since a device such as a steady rest is not required, high versatility can be obtained without affecting the processing region.

Moreover, the cutting angle can be easily set to an angle with large dynamic rigidity by changing the tilt angle of the tool post. The lower saddle and the upper saddle cross the axis of the cutting tool with the axis of the work, and cutting of the rotating work can be performed while the work axis and the tool axis are maintained in the cross state. As a result, accurate lathe turning can be implemented.

It should be noted that, in the first and second embodiments, the cutting tools 6, 19 are moved with respect to the work 5. Cutting is performed through relative movement of the work 5 and the cutting tools 6, 19, however, and the work 5 may be moved with respect to the cutting tools 6, 19.

Third Embodiment

Figure 6:
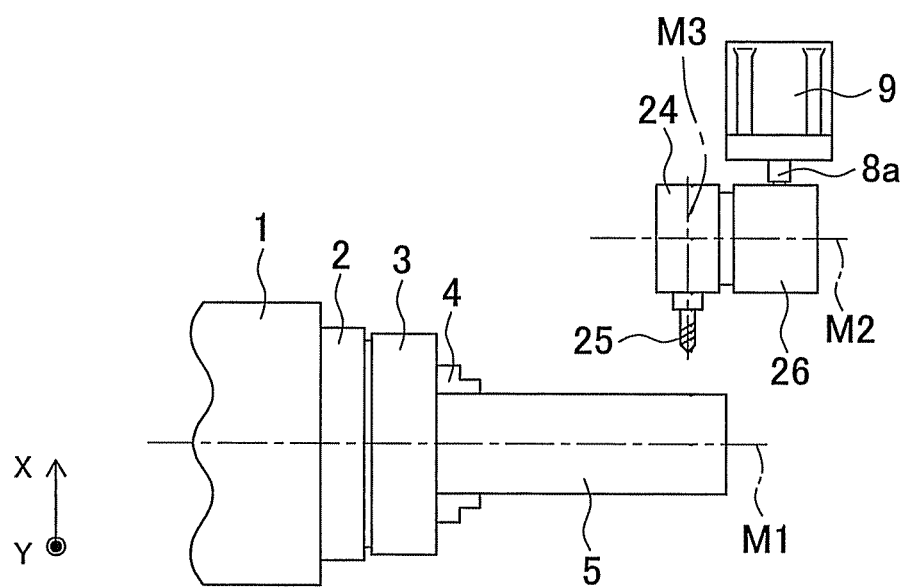
FIG. 6 is a plan view illustration showing a third embodiment of the cutting apparatus according to the present invention.
Figure 7:
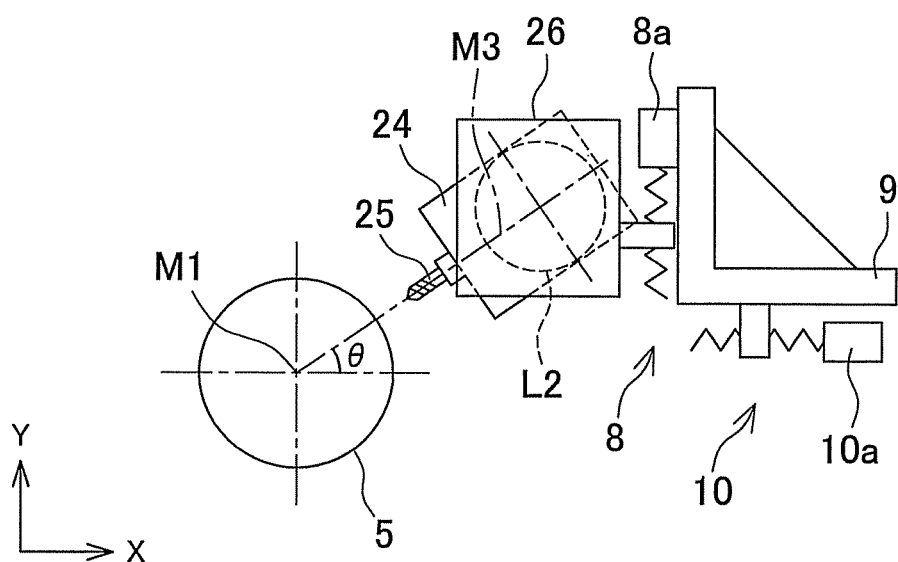
FIG. 7 is a front view illustration of FIG. 6.

FIGS. 6 and 7 are illustrations showing a third embodiment of the cutting apparatus according to the present invention. FIG. 6 is a front view from the Y-axis direction, and FIG. 7 is a front view from an axis-M direction of the work 5. The cutting apparatus of the third embodiment has a similar tool drive mechanism to that of the first embodiment, but is different from the first embodiment in that a cutting tool 25 itself rotates to perform rotary cutting.

In FIGS. 6 and 7, reference numeral 24 indicates a tool main spindle having a built-in tool rotation motor (not shown), reference numeral 25 indicates a rotating tool (cutting tool) for performing rotary cutting, and reference numeral 26 indicates a main-spindle support for moving the tool main spindle 24 using a saddle 9. Components similar to those of FIG. 1 are denoted by the same reference numerals and characters as used in FIG. 1. The main-spindle support 26 is provided with a tool-main-spindle pivoting portion L2 for enabling the cutting angle of the cutting tool 25 to be changed.

Figure 8:
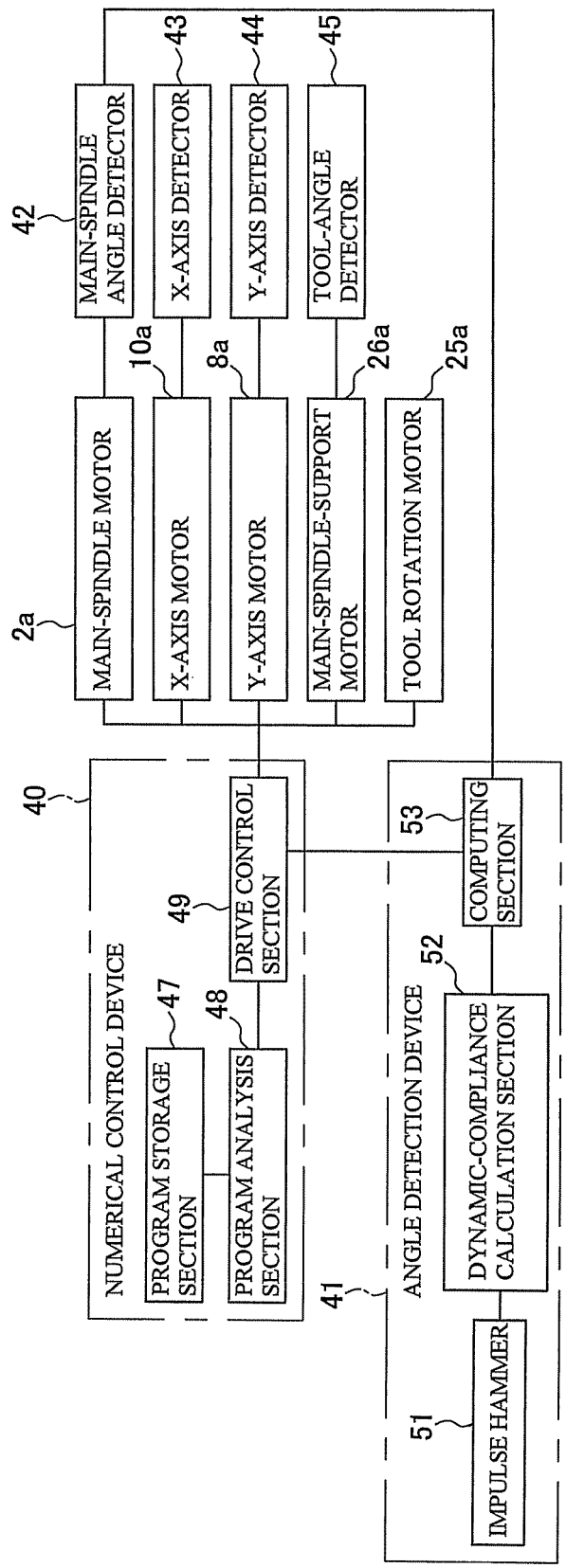
FIG. 8 is a block diagram of a control device of the cutting apparatus of FIG. 6.

FIG. 8 shows a control device for controlling this cutting apparatus. The control device of FIG. 8 is different from that of FIG. 3 in that the control device of FIG. 8 additionally controls a tool rotation motor 25*a* for rotating the tool 25, and that the cutting angle of the cutting tool 25 is changed by a main-spindle-support motor 26*a* for driving the tool-main-spindle pivoting portion L2. It should be noted that components similar to those of FIG. 3 are denoted by the same reference numerals and characters as used in FIG. 3, and descriptions thereof will be omitted.

The cutting apparatus structured as described above performs cutting as follows. First, an angle (θ) with the largest dynamic rigidity is obtained by the procedure described in the first embodiment. This angle is an angle viewed from the X-axis direction, and FIG. 7 shows a state in which the cutting angle has been set to the obtained angle θ.

Based on the angle information thus obtained, the numerical control device 40 pivots the tool-main-spindle pivoting portion L2 of the main-spindle support 26 to set the cutting angle toward the rotation center of the work 5 to θ. The numerical control device 40 then controls the X-axis motor 10a and the Y-axis motor 8a so that the tool axis M3 of the cutting tool 25 crosses the work axis M1 at this angle, and the cutting tool 25 cuts the work 5 toward the work axis M1.

In this case, cutting of the work 5 is performed without rotating the work 5. Cutting of the work 5 is performed by rotating the cutting tool 25 using the tool rotation motor 25a while the cutting angle θ of the cutting tool 25 is maintained at a fixed value and the tool axis M3 and the work axis M1 are maintained in the crossed state. In other words, rotary cutting of the work is performed by cutting the work 5 toward the work axis M1 with the rotating tool 25.

It should be noted that a similar operation is performed when the outer periphery of the work is grooved or a plane surface of the work is processed by feeding a tool such as an end mill in the axis direction of the work. In this case, cutting is performed by indexing an angle of the cutting tool 25, by cutting the work by feeding the tool along the tool axis M3 in a moving operation achieved by synthesis of the X-axis and the Y-axis, and further by causing movement along a Z-axis (the work axis direction) that is not shown.

Because the cutting angle toward the rotation center of the work is thus set to a direction in which the work has large dynamic rigidity, the generation of chatter vibration can be suppressed and accurate processing can be implemented. In addition, since a device such as a steady rest is not required, high versatility can be obtained without affecting the processing region.

Moreover, the cutting angle can be easily set to an angle with large dynamic rigidity by pivoting the tool-main-spindle pivoting portion of the main-spindle support, and cutting with the rotating tool can be performed by translating the cutting tool using the X-axis moving mechanism portion and the Y-axis moving mechanism portion while the work axis and the tool axis are maintained in the crossed state. As a result, accurate rotary cutting can be implemented.

Fourth Embodiment

Figure 9:
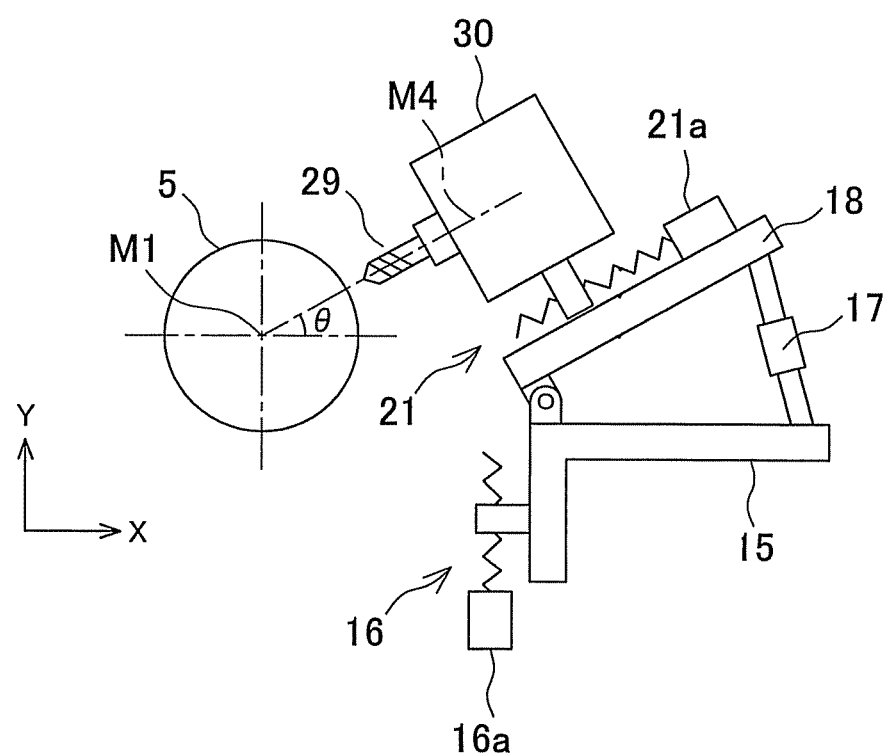
FIG. 9 is a front view illustration showing a fourth embodiment of the cutting apparatus according to the present invention.

FIG. 9 shows a fourth embodiment of the cutting apparatus according to the present invention. FIG. 9 is a front view from the axis direction of the work 5. The cutting apparatus of the fourth embodiment has a similar tool drive mechanism to that of the second embodiment, but is different from the second embodiment in that a cutting tool 29 itself rotates to perform rotary cutting.

In FIG. 9, reference numeral 29 indicates a rotating tool (cutting tool) for performing rotary cutting, and reference numeral 30 indicates a tool post having a built-in motor (tool rotation motor). Components similar to those of FIG. 4 are denoted by the same reference numerals and characters as used in FIG. 4, and descriptions thereof will be omitted.

Figure 10:
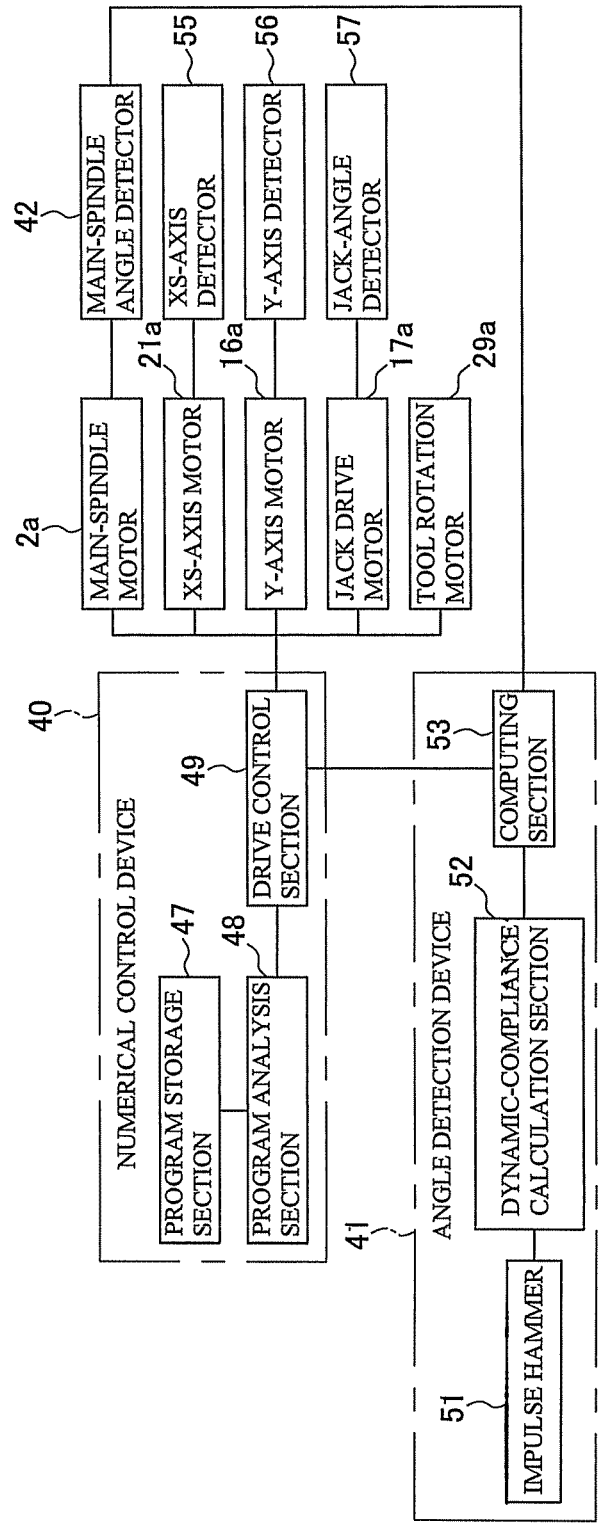
FIG. 10 is a block diagram of a control device of the cutting apparatus of FIG. 9.
Figure 11:
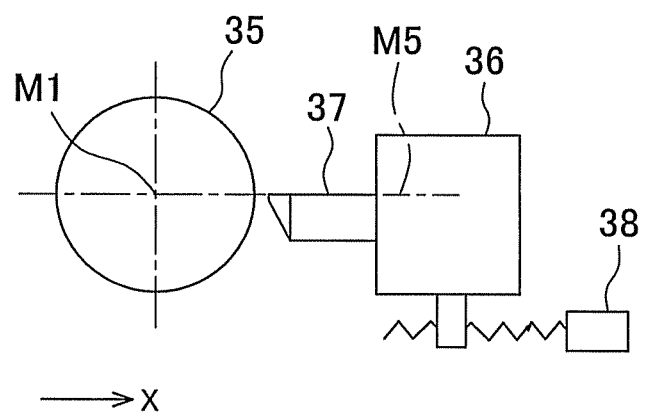
FIG. 11 is a schematic diagram of a conventional cutting apparatus.
Figure 12:
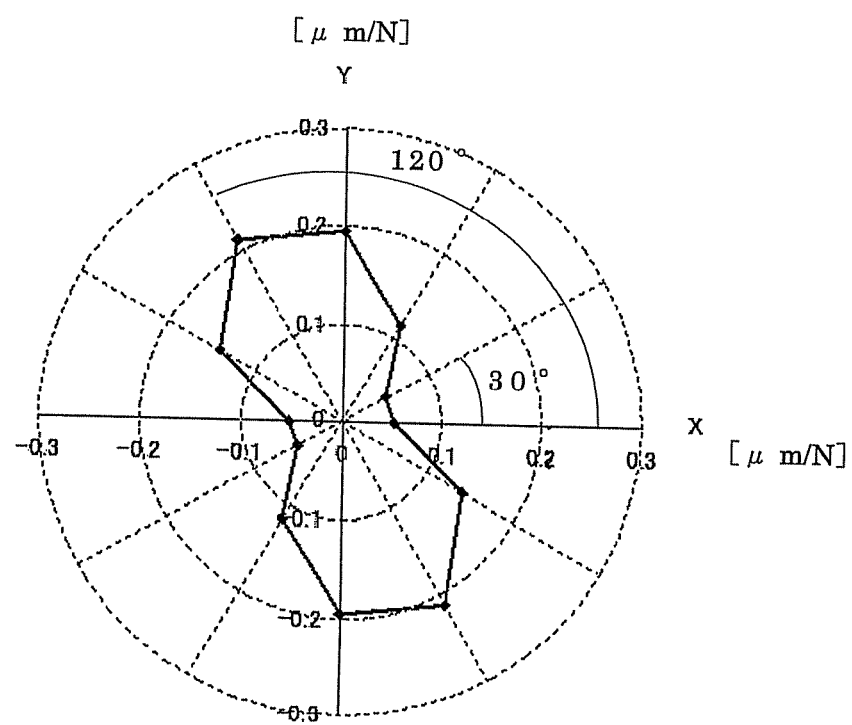
FIG. 12 is a measurement diagram of the dynamic compliance of a work which shows that the dynamic rigidity of the work is anisotropic.

FIG. 10 shows a control device for controlling this cutting apparatus. The control device of FIG. 10 is different from that of FIG. 5 in that the control device of FIG. 10 additionally controls a tool rotation motor 29a for rotating the cutting tool 29. Components similar to those of FIG. 5 are denoted by the same reference numerals and characters as used in FIG. 5, and descriptions thereof will be omitted.

The cutting apparatus structured as described above performs cutting as follows. First, an angle (θ) with the largest dynamic rigidity is obtained by the procedure described in the first embodiment. This angle is an angle viewed from the X-axis direction, and FIG. 9 shows a state in which the cutting angle has been set to the obtained angle θ. The numerical control device 40 controls the jack drive motor of the jack 17 to set the cutting angle toward the rotation center of the work 5 to θ.

Next, the numerical control device 40 adjusts the height of the tool post 30 using the Y-axis motor 16a of the Y-axis moving mechanism portion 16 so that the work axis M1 and the tool axis M4 cross each other. Then, the numerical control device 40 controls the XS-axis motor 21a of the XS-axis moving mechanism portion 21 to translate the tool post 30 and the cutting tool 29, thereby cutting the work 5 toward the axis M1 of the work 5 with the rotating cutting tool 5. Cutting (rotary cutting) is thus performed in this manner.

It should be noted that, like the third embodiment, a similar operation is performed when the outer periphery of the work is grooved or a plane surface of the work is processed by feeding a tool such as an end mill in the axis direction of the work. In this case, cutting is performed by indexing an angle of the cutting tool 29, cutting the work by feeding the tool along the tool axis M4 in a moving operation along the XS-axis, and through further movement along the Z-axis (the work axis direction) that is not shown.

Because the cutting angle toward the rotation center of the work is thus set to a direction in which the work has large dynamic rigidity, the generation of chatter vibration can be suppressed and accurate processing can be implemented. Further, since a device such as a steady rest is not required, high versatility can be obtained without affecting the processing region.

Moreover, the cutting angle can be easily set to an angle with large dynamic rigidity by changing the tilt angle of the tool post. The lower saddle and the upper saddle cross the axis of the cutting tool with the axis of the work, and the work can be cut with the rotating tool while maintaining the cutting angle. As a result, the generation of chatter vibration is suppressed and accurate rotary cutting can be implemented.

It should be noted that in each of the above embodiments, the control device includes the angle detection device 41, and obtains the direction with largest dynamic rigidity by calculating dynamic compliance through a control of the control device itself. However, the angle detection device 41 may be provided as a separate element from the control device, that is, as a separate element from the cutting apparatus, and the angle detection device 41 may be mounted when it is necessary to obtain dynamic compliance and the like.

What is claimed is:

1. A cutting method for cutting a work comprising steps of:
providing a cutting tool having a cutting edge axis located in a plane perpendicular to a rotational axis of the work such that the cutting tool is oriented toward the rotational axis such that the cutting edge axis intersects the rotational axis of the work;
providing an angle changing unit for changing an angle of the cutting edge axis of the cutting tool relative to the work in the plane perpendicular to the rotational axis;
detecting an angular position about the rotational axis of the work at which the work has largest dynamic rigidity, the angular position about the rotational axis of the work being detected as an angle between the angular position and an axis perpendicular to the rotational axis and in the plane perpendicular to the rotational axis of the work;
adjusting the angle changing unit so that the cutting edge axis of the cutting tool intersects the rotational axis of the work in the plane perpendicular to the rotational axis and is oriented at an angle, set as a set cutting angle, with said axis that is perpendicular to the rotational axis, which set cutting angle is equal to said angle between the angular position and said axis perpendicular to the rotational axis at which the work has the largest dynamic rigidity around the rotational axis of the work; and performing a desired cutting operation in which the cutting tool cuts the work that is rotating around the rotational axis while maintaining the set cutting angle.

* * * * *